United States Patent [19]

Kneer

[11] Patent Number: 5,181,950
[45] Date of Patent: Jan. 26, 1993

[54] PROCESS FOR COMPOSITING ORGANIC WASTE AND INSTALLATION FOR IMPLEMENTING THE PROCESS

[75] Inventor: Franz X. Kneer, Eschenburg-Eibelshausen, Fed. Rep. of Germany

[73] Assignee: Gebruder Weiss K.G., Dillenburg, Fed. Rep. of Germany

[21] Appl. No.: 313,287

[22] Filed: Feb. 17, 1989

Related U.S. Application Data

[63] Continuation of Ser. No. 24,325, Mar. 10, 1987, abandoned.

[30] Foreign Application Priority Data

Mar. 10, 1986 [DE] Fed. Rep. of Germany ....... 3607920

[51] Int. Cl.⁵ .......................... C05F 11/08; B01J 1/00; C02F 11/16
[52] U.S. Cl. ............................................. 71/9; 71/10; 435/287; 422/184
[58] Field of Search ....................... 71/9, 10; 435/287; 422/184

[56] References Cited

U.S. PATENT DOCUMENTS 4,135,908  1/1979  Widner ...................................... 71/9
4,374,804  2/1983  Easter .................................. 71/9 X
4,392,881  7/1983  Kneer ........................................ 71/9

FOREIGN PATENT DOCUMENTS 2933565  8/1980  Fed. Rep. of Germany ............ 71/9

Primary Examiner—Ferris Lander
Attorney, Agent, or Firm—Anderson Kill Olick & Oshinsky

[57] ABSTRACT

Disclosed are a process and an apparatus for compositing organic waste in two consecutive retting steps, the first of which is anaerobic and the second aerobic. In each step, the material to be decomposed is aerated with fresh air under pressure and the resulting spent waste gases are aspirated as spent air. The spent air ($AL_2$) obtained from the second step of the process-the postdecomposition or retting step is mixed with fresh air (FL) used in the decomposition or first step, as shown in the drawing. The invention is particularly intended for use in with the so-called "retting processes" wherein fibers are soaked or exposed to moisture to promote loosening of the fiber from woody tissues by bacterial action. Generically, the term implies a rotting or injuring by exposure to moisture. The retting process can also involve a chemical treatment and its main object is to make possible gathering and baling of black inner fibers; as defined in Webster's "Third New International Dictionary."

12 Claims, 1 Drawing Sheet

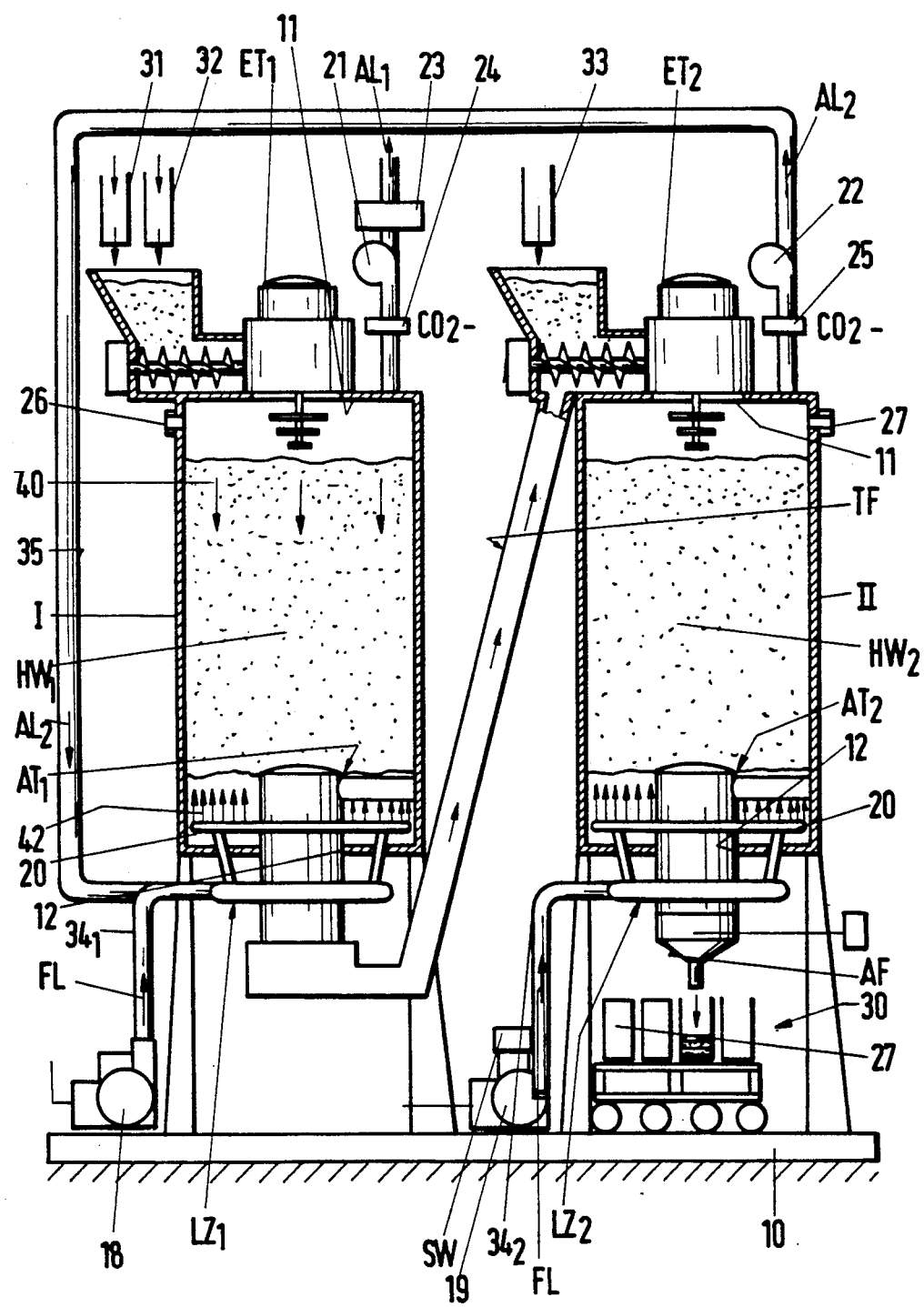

PROCESS FOR COMPOSITING ORGANIC WASTE AND INSTALLATION FOR IMPLEMENTING THE PROCESS

This is a continuation of Ser. No. 07/024,325 filed Mar. 10, 1987, abandoned.

FIELD OF THE INVENTION

The invention relates to a process and an apparatus for composting organic waste in two consecutive steps of this process and to a "retting as defined in the abstract.

STATEMENT OF PRIOR DISCLOSURES

A two-step process for decomposing or retting organic wastes is known from German Offenlegungschrift 3.024,813. According to that process, the material to be decomposed or rotted is placed from above into a first vessel, or predecomposition vessel, and discharged at its base so that each particle of the column of material comprising the decomposing material passes through the first vessel within 7 to 14 days. At the same time, the column of material is aerated continuously and countercurrently from below in such a manner, that a different heat and oxygen stratification with a specifically aerobic and/or a specifically anaerobic distribution of bacteria is developed within the column of material. The rotting material, which is still active biologically, is transferred to a second vessel, the post-decomposition vessel, in proportion to the amount discharged from the first vessel and passes through this vessel within 14 to 20 days. During this time, the second vessel is aerated so that exclusively aerobic decomposition take place in the material debris therein to convert the pre-decomposed material into a mature or finished compost.

To maintain strictly aerobic decomposition or retting conditions, it is necessary to provide an excess of air everywhere in the debris enclosed by the decomposition vessel, in order to provide sufficient oxygen for respiration for the active microorganisms therein.

This provision requires a relatively large blower energy for the forced aeration of the post-decomposition vessel, since the mass of debris represents a considerable resistance to the air flowing through.

After the decomposition process in the post-decomposition vessel has already proceeded extensively, only relatively little oxygen is absorbed by the microorganisms active there, so that the waste air has a relatively high proportion of oxygen and, after flowing through the debris, is blown unused into the atmosphere.

On the other hand, anaerobic retting conditions also exist in the pre-retting vessel. An excess of air need therefore not be present in all regions. However, the resistance of the debris to the flow of air is considerably greater in the predecomposition vessel than in the post-decomposition vessel, since the waste there is still undecomposed. On the other hand, the investment and operating costs are, also determined significantly by the size and the energy requirements of the fans needed.

OBJECTS AND SUMMARY OF THE INVENTION

With a view to overcoming the foregoing disadvantages of the above outlined prior art processes, an object of the invention is to provide a novel process which is technologically simpler than aforesaid processes. An equally important object is to provide a novel process improved by a decrease in energy consumption of the decomposition. A further objection of the invention is to provide a more typically biological, or, bioprocess than those of the prior art and an apparatus for this process.

These objects are achieved in accordance with the invention which, in its process aspect, resides in a process for composting organic waste in two consecutive process steps, preferably in an anaerobic and aerobic first step and an aerobic second step, the waste, adjusted to a rettable C/N ratio, in each case being aerated countercurrently with fresh air under pressure and the waste gases, arising during the two process steps, being drawn off with suction pressure as waste air, wherein waste air ($AL_2$), obtained from the post-retting process of the second step of the process, is admixed with fresh air (FL) destined for the decaying process of the first step of the process.

In a modification, all or some of the waste air (AL) also produced in a pre-retting vessel (I), is supplied together with the fresh air (FL) from below, once again, to the pre-retting vessel (I), preferably countercurrently to the pre-retted material ($HW_1$) migrating from the top to the bottom.

In its apparatus aspect, the invention is an apparatus or installation for implementing the above process wherein the waste to be decomposed or the material to be retted is fed to pre-retting vessel(s) from above, which is or are aerated continuously from below by means of forced-draft fans and over compressed air lines with fresh air countercurrently to the retting material migrating downwards, whereupon the retted material is transported to a post-retting vessel, into which it is charged from above while compressed air is supplied simultaneously and countercurrently to the post-retting material migrating from top to bottom and to the upper end of which a suction fan (22) is connected for evacuating the vessel gases as waste air. The apparatus has a connecting line (35), leading to a compressed air line ($34_1$) of the pre-retting vessel (I), connected to a suction fan (22) for evacuating waste air ($AL_2$) from a post-retting vessel (II). In a modification of the apparatus, several pre-retting vessels are provided for carrying out the first step of the process.

FEATURES AND ADVANTAGES OF THE INVENTION

This process and the apparatus for carrying out the process have many advantages. Thus, the forced-draft fan or fans, which introduce fresh air into the pre-decomposition or retting vessel or vessels is/are supported by the force of the suction fan of the post-decomposition vessel that evacuates the waste air from this vessel. The required force of the fresh air fan or fans can be designed for correspondingly lower rating and considerable energy can therefore be saved. Moreover, due to the decaying process in the post-retting vessel, the temperature of the waste air or waste gases from this vessel is higher than that of the surrounding air. The fresh air supplied therefrom to the pre-retting vessel or vessels is therefore heated and this has a favorable or accelerating effect on the retting process. Finally, the waste air from the post-retting process is laden with microorganisms and thus can supply inoculating material to the pre-retting vessel or vessels, so that the retting process in the pre-retting vessel can be initiated better than before.

The technical journal for environmental technology "w 1 b" (Water, Air and Operation), 6th edition (June) 1984, reported that the waste air from bioreactors for pre-retting sludge mixed with carbon carriers may be evacuated in the upper region of the bioreactor and introduced into an aeration tank to activate the sludge in the effluent present there. This reference, however, does not provide any suggestion for saving of fan power for the forced aeration of the retting vessels as disclosed herein.

BRIEF DESCRIPTION OF THE DRAWING

The single FIGURE accompanying this specification is a schematic representation of an apparatus for carrying out the process of the invention, with only one pre-retting vessel being shown, the apparatus being shown by way of example only.

DISCLOSURE OF BEST MODES OF THE INVENTION

Referring to the drawing, the apparatus can have several pre-retting or decomposition vessels, all of which can then be supplied with waste air from the post-retting or decomposition vessel.

As shown, a cylindrical pre-retting vessel I and a cylindrical post-retting vessel II, both of which have a central inlet opening 11 at the top, as well as a central outlet opening 12 at the base are mounted on base 10. Motor-driven supply devices ET 1 and ET 2 are connected to inlet openings 11, while motor-driven discharge devices AT 1 and AT 2 communicate with outlet openings 12. Connected to the base of each vessel I and II are air-supply devices $LZ_1$ and $LZ_2$, which are supplied over a motor-driven forced-air fan 18 and 19, respectively and over compressed-air lines $34_1$ and $34_2$ supplied with fresh air, which is taken from the atmosphere and conveyed over aeration pipes 20 into the vessels I and II. The air flows through the vessels countercurrently to the pre-retting material—debris —$HW_1$ and the post-retting material—debris —$HW_2$ migrating from the top to the bottom of the vessel.

A suction fan 21, communicating with pre-retting vessel I, produces a reduced pressure above the debris $HW_1$ in vessel I, so that the air-gas mixture collecting here, so-called waste air $AL_1$, is evacuated and next purified by a filter 23, is blown into the atmosphere.

A suction fan 22 is associated also with the post-retting vessel II. This fan 22 produces a reduced pressure above the debris $HW_2$ in the post-retting vessel II, so that the air-gas mixure collecting here, waste air $AL_2$, is evacuated and conveyed in a connecting line 35, which discharges in the compressed-air line $34_1$. In this manner, not only fresh air FL from the atmosphere, but additionally also heated air $Al_2$ is supplied over the supply means $LZ_1$ from below to the pre-retting vessel I.

$CO_2$ measuring devices 24 and 25 are inserted in each of the waste-air lines. The throughput of fresh air and of waste air and thus the throughput of air for the retting material $HW_1$ is controlled as a function of the $CO_2$ content of the waste air $AL_1$ or "feedback value" and of the set value specified for the pre-retting vessel I over a control unit, of usual design which is not shown and which controls the driving motors of the fans 18 and 21. The air throughput through the post-retting vessel II is adjusted by a switching device SW, by means of which the forced-draft fan 19 as well as the suction fan 22 are switched on. At the same time, the post-retting vessel II is adjusted so that it is forcibly aerated continuously with a slight excess of external air. By these means, it is assured that aerobic conditions are constantly present in the post-retting vessel and that there is never an oxygen deficiency in the waste air therein. As a result of this excess of air and the aerobic retting resulting therefrom in the post-retting vessel, the waste air can be returned to the pre-retting vessel, since it has sufficient oxygen—never less than 18% $O_2$—and is filled with spores and conidia (asexual spores produced from the tip of a condiophore).

Each of the vessels I and II is provided with a vacuum valve 26 and 27, which connect and evacuate partially to the atmosphere, as soon as a predetermined vacuum in the vessels I and II is exceeded.

For the sake of completeness it should be mentioned that the discharge opening 12 of the pre-retting vessel I is connected over a feeding device TF with supply device ET 2 for inlet 11 of post-retting vessel II. Filler mechanism AF is associated with outlet or discharge opening 12 of post-retting vessel II and works together with a transfer device or conveyor 30 for bags 27 that accommodate the mature compost after baling.

The organic waste, which is to be decomposed, retted or composted is supplied to the supply device ET 1 over a suitable transport mechanism 31 and admixtures of retting agents and carbon carriers, such as sawdust, required to adjust the C/N ratio so that retting can take place, are supplied over a transport mechanism 32. Mixtures of organic and/or inorganic retting promoters which enrich the retting material, can be supplied over a transport mechanism 33 to the supply device $ET_2$. These admixtures are mixed intimately with the almost completely decayed material taken from the pre-retting vessel I, before they are conveyed to the supplying device $ET_2$ of the post-retting vessel II in order to participate there in the final or decomposition maturing process.

Within the scope of the invention, it is feasible not to blow the waste air $AL_1$, produced in the pre-retting vessel I, into the atmosphere, and instead to mix at least a part of it with the fresh air FL for the pre-retting vessel I, that is, to introduce it into the connecting line 35, in order also to achieve thus an inoculation of fresh air.

A further advantage of the invention is that the return of waste air from the post-retting vessel into the air supply of the pre-retting vessel is feasible in already existing systems of the present type. For this purpose, only an additional return line is required to retrofit such apparatus or systems.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive to the invention, the scope of which is defined in the appended claims and that all modifications that come within the meaning and ranges of equivalency of the claims are intended to be included therein.

What is claimed is:

1. In a process for composting organic waste by retting comprising:
   treating said waste in a first, anaerobic and aerobic decomposition step with countercurrent aeration;

consecutively treating the resulting treated waste in a second aerobic post-retting decomposition step with countercurrent aeration by fresh air;

drawing off under suction waste air produced in said first and second step;

determining the $CO_2$ content in the waste air from said first and second steps; and controlling the amount of said fresh air and said suction waste air of said aeration in said second step as a function of said determination of $CO_2$ in the suction waste air from said second step so as to continuously maintain aerobic conditions in said second step; the improvement comprising recycling the suction waste air from said second step for said aeration in said first step and controlling admixture of fresh air to said waste air as a function of said determination of $CO_2$ in the suction waste air from said first step.

2. The process of claim 1, wherein at least some of the gases produced in said pre-retting step and fresh air are introduced in the lower part of a pre-retting vessel while pre-retted material is displaced from top to bottom therein.

3. The process of claim 1, wherein the resulting finished mature compost is baled.

4. The process of claim 1, wherein organic and/or inorganic materials are added to enrich said organic wastes in said first step.

5. The process of claim 4, wherein said enriched wastes are flowed to said second step.

6. The process of claim 1, wherein some waste air produced in said first step is evacuated to the atmosphere.

7. In an apparatus for composting organic wastes, in particular, by retting, comprising:

a first vessel for anaerobically and aerobically decomposing the organic waste in a pre-retting process, said first vessel receiving said waste;

a second vessel for aerobically decomposing the organic waste in a post-retting process, said second vessel including means for receiving said pre-retted waste from said first vessel;

conduit means for conveying said pre-retted waste from said first to said second vessel;

first and second suction means associated with said first and second vessels, respectively, for exhausting waste air produced in said first and second vessels;

first and second detector means for determining the $CO_2$ content in the waste air from said first and second vessels;

first and second forced-air supply means for countercurrent aeration of said first and second vessels; and control means for controlling the amount of fresh air supplied by said second forced-air supply means and the amount of waste air exhausted by said second suction means as a function of the $CO_2$ content determined by said second detector means for continuously maintaining an excess of air in said waste air from said second vessel, the improvement comprising pipe means for returning said waste air from said second suction means to said first vessel; and said control means controlling the amount of admixture of fresh air by said first forced-air supply means to said returned amount of waste air and the amount of waste air exhausted by said first suction means as a function of the $CO_2$ content determined by said first detector means.

8. The apparatus of claim 7, further including first supply means communicating with the upper part of said pre-retting vessel for feeding organic wastes and retting agents thereto, and second supply means communicating with said post-retting material to supply retting—promoting agents to said post-retting vessel.

9. The apparatus of claim 7 further including discharge means mounted on said post-retting vessel.

10. The apparatus of claim 9, further including baling means receiving compost from said discharge means for baling said compost.

11. The apparatus of claim 10, further including conveying means; said baling means being mounted on said conveying means.

12. The apparatus of claim 7, further including fresh air supply means connected to the lower part of said vessels; aeration pipes mounted in the lower part of said vessels and a compressing means communicating with said air supply means to compress said fresh air.

* * * * *